United States Patent [19]

Nagumo

[11] 4,227,206
[45] Oct. 7, 1980

[54] SOLID STATE TELEVISION CAMERA
[75] Inventor: Fumio Nagumo, Yokohama, Japan
[73] Assignee: Sony Corporation, Tokyo, Japan
[21] Appl. No.: 950,458
[22] Filed: Oct. 11, 1978
[30] Foreign Application Priority Data Oct. 13, 1977 [JP] Japan ............................. 52-122736

[51] Int. Cl.² ........................................... H04N 9/07
[52] U.S. Cl. ................................................... 358/44
[58] Field of Search ............................ 358/43, 44, 55

[56] References Cited
U.S. PATENT DOCUMENTS 2,734,939  2/1956  Houghton .............................. 358/44

Primary Examiner—Richard Murray
Attorney, Agent, or Firm—Hill, Van Santen, Steadman, Chiara & Simpson

[57] ABSTRACT

A solid state color television camera having a color filter consisting of first and second color filter elements through which red and green primary color lights pass and a third color filter element through which a blue color light and the red color light pass and a solid state image sensing device, in which from the solid state image sensing device there are obtained a red primary color signal in response to a red primary color information passed through the first filter element, a green primary color signal in response to a green primary color information passed through the second filter element, a composite color (magenta) signal in response to a color information passed through the third filter element, a luminance signal is provided from the red and green primary color signals and the composite color signal, a blue primary color signal is provided by calculating the composite color signal and the red primary color signal, and a carrier color signal is provided from the red, green and blue primary color signals.

8 Claims, 30 Drawing Figures

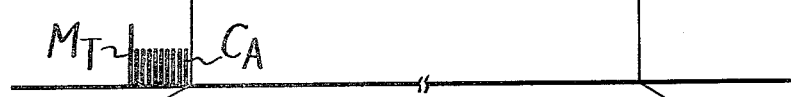
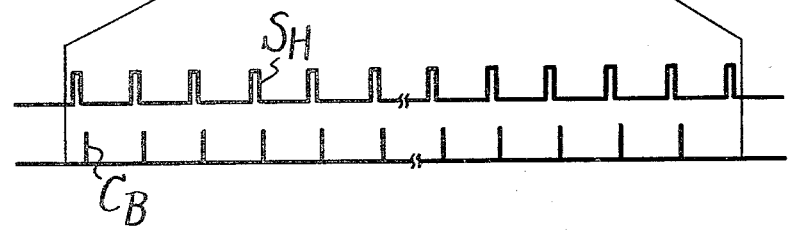
FIG. 2A
FIG. 2B
FIG. 2C
FIG. 2D
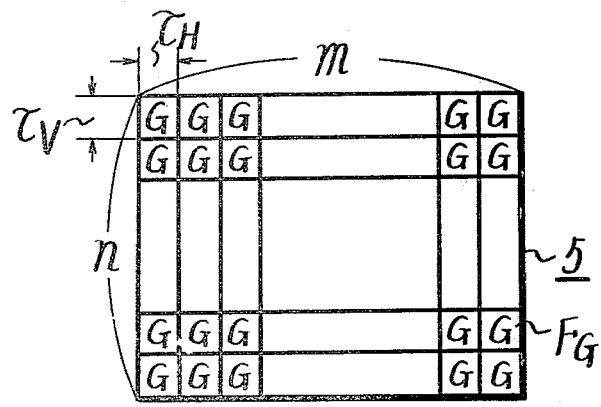
FIG. 3
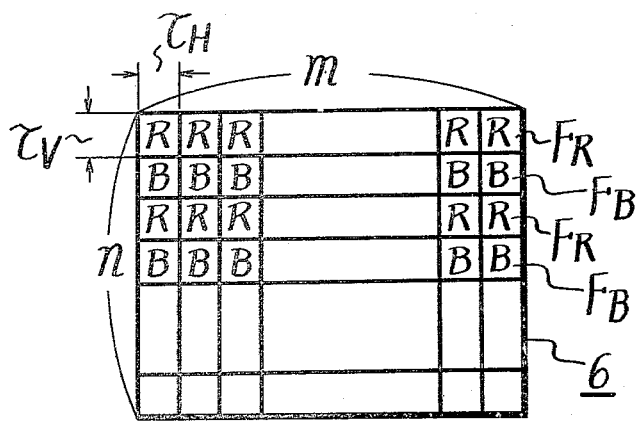
FIG. 4

FIG. 7A
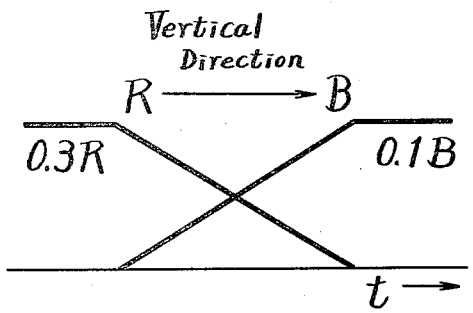
FIG. 7B
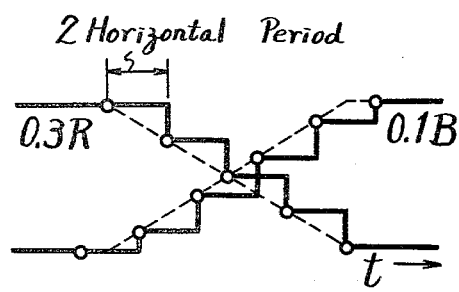
FIG. 7C
$Y = 0.59G + 0.3R + 0.11B$
$G = 0$
FIG. 7D
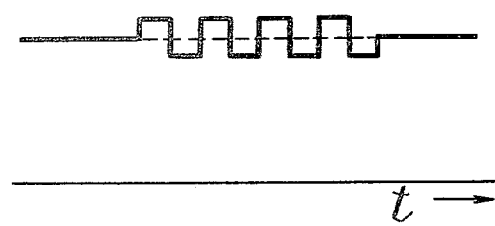

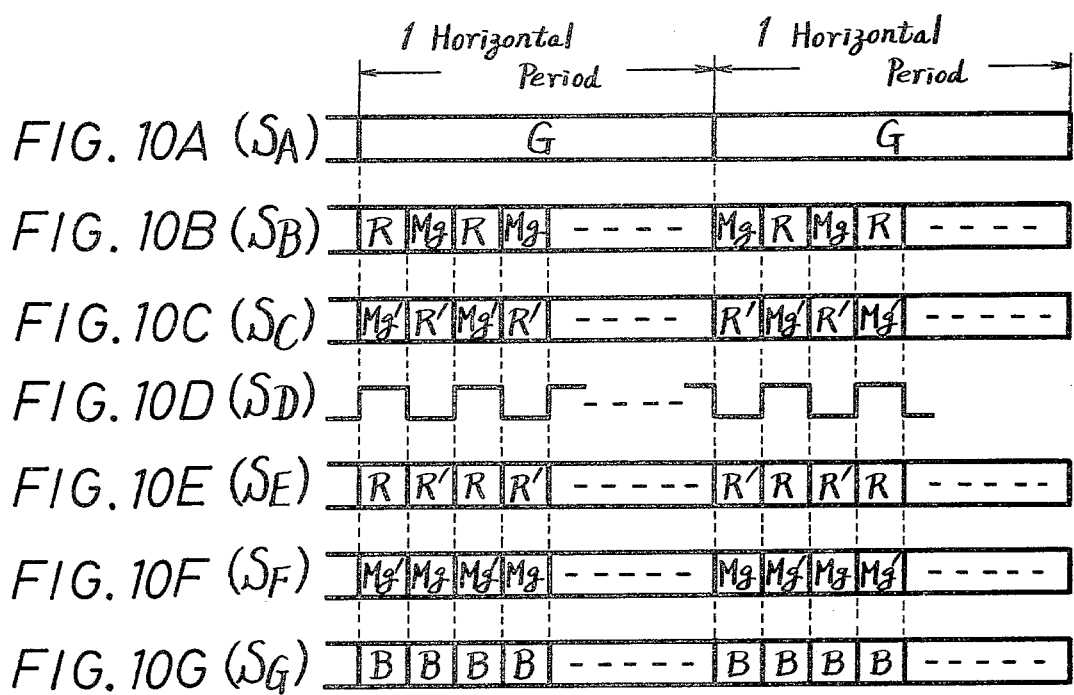
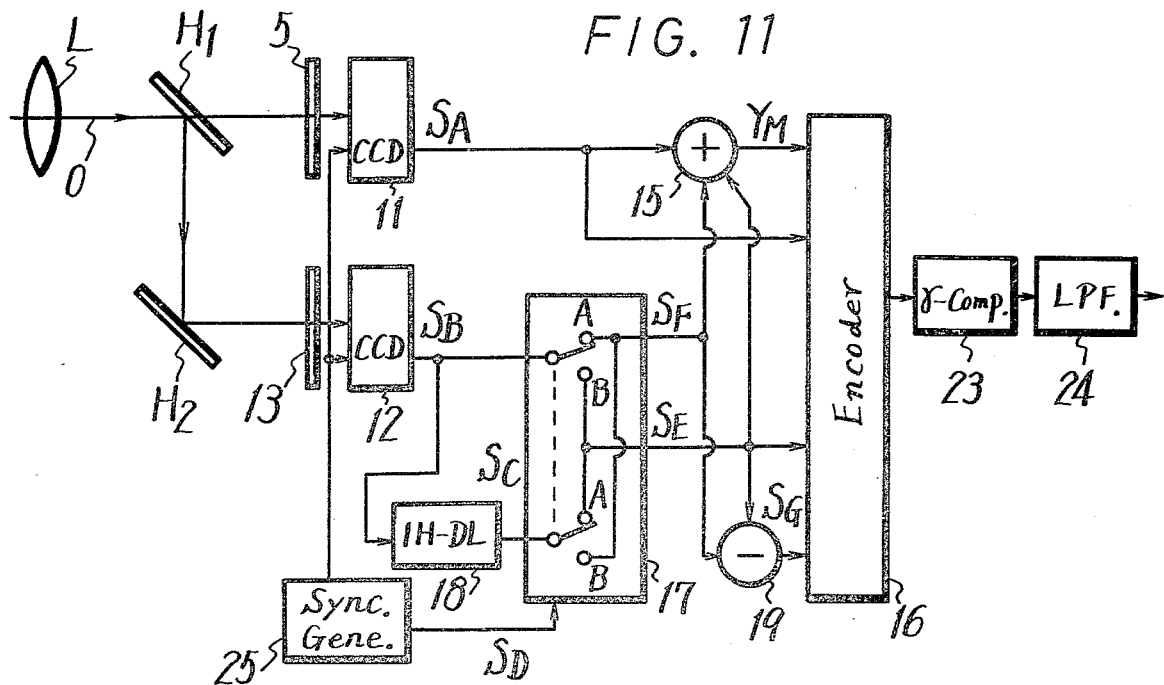

FIG. 12

| | $F_R$ | $F_{Mg}$ | | | | |
|---|---|---|---|---|---|---|
| N | R | Mg | R | Mg | R | - - - - - - - - - |
| N+263 | R | Mg | R | Mg | R | - - - - - - - - - |
| N+1 | Mg | R | Mg | R | Mg | - - - - - - - - - |
| N+264 | Mg | R | Mg | R | Mg | - - - - - - - - - |
| N+2 | R | Mg | R | Mg | R | - - - - - - - - - |
| N+265 | R | Mg | R | Mg | R | - - - - - - - - - |

FIG. 13

| | $F_G$ | $F_R$ | $F_{Mg}$ | | | | |
|---|---|---|---|---|---|---|---|
| N | G | R | G | Mg | G | R | - - - - - - - - |
| N+263 | G | R | G | Mg | G | R | - - - - - - - - |
| N+1 | G | Mg | G | R | G | Mg | - - - - - - - - |
| N+264 | G | Mg | G | R | G | Mg | - - - - - - - - |
| N+2 | G | R | G | Mg | G | R | - - - - - - - - |
| N+265 | G | R | G | Mg | G | R | - - - - - - - - |

SOLID STATE TELEVISION CAMERA

BACKGROUND OF THE INVENTION

1. Field of the Invention

The present invention relates generally to a solid state color television camera, and is directed more particularly to a color filter which will be used in the solid state color television camera.

2. Description of the Prior Art

In order to provide a color television signal from a color camera, red, green and blue primary color signals are necessary. In the art, there is proposed a color camera in which, instead of using three solid state image sensing devices for the respective primary color lights, one or two solid state image sensing devices are used so as to provide three primary color signals. The reason why only one or two solid state image sensing devices such as a bucket brigade device (BBD), charge coupled device (CCD) or the like are used is that, by using one or two solid state image sensing devices, a color camera becomes not only small in size, inexpensive and simple in its circuit construction, but also reduces a mis-registration between the respective image sensing devices as compared with the case where three solid state image sensing devices are used.

In such a color camera, for example, the green primary color signal which will affect on the resolution much is obtained at every horizontal interval, while red and blue primary color signals are obtained alternately at every other horizontal interval in a line sequential manner. With the prior art color camera in which the red and blue primary color signals are obtained in the line sequential manner there may appear such a defect that the luminance signal is distorted due to the line sequential property itself.

OBJECTS AND SUMMARY OF THE INVENTION

Accordingly, an object of the invention is to provide a solid state color television camera in which a color distortion is reduced by using a simultaneous color signal in place of a line-sequential color signal.

Another object of the present invention is to provide a solid state color television camera in which a CCD chip is used as a first image sensing device, a color filter, through which a green color light passes, is applied to the CCD chip, and a color filter consisting of a filter element, which passes therethrough a magenta light, and a filter element, which passes therethrough a red light, arranged in a checkered pattern is applied to a second CCD chip, and in which output signals from the two CCD chips are processed such that the green signal from the first CCD chip and the line-sequential red and magenta signals from the second CCD chip are made in simultaneously, and thereafter the red and magenta signals and the green signal are composed to provide the luminance signal.

According to an aspect of the present invention, there is provided a solid state color television camera having a solid state image sensing device including a plurality of individual light sensing units arranged in both horizontal and vertical rows, which comprises a plurality of color filter elements with different transmissibilities faced with said individual light sensing units including first and second color filter elements for transmitting first and second primary color signals and third color filter elements for transmitting both of third and said first primary color signals as a composite color signal, a switching circuit for converting line sequential signals produced from each of said light sensing units into a simultaneous color signal, an adder for adding said first and second primary color components and said composite color signal produced from each of said light sensing unit faced with said first, second and third color filter elements individually by which a luminance signal is composed, a mixer for mixing said composite color signal and said first primary color signal from which said third primary color signal is produced, and a color encoder for encoding said first, second and third primary color signal components from which a composite color television signal is produced.

The other objects, features and advantages of the present invention will become apparent from the following description, taken in conjunction with the accompanying drawings.

BRIEF DESCRIPTION OF THE DRAWINGS

FIGS. 2A to 2D are waveform diagrams used for explaining the television camera shown in FIG. 1;

FIGS. 3 and 4 are plan views showing color filters disposed in front of the CCDs shown in FIG. 1;

FIGS. 5A to 5F are diagrams showing outputs from the CCDs;

FIGS. 7A to 7D are diagrams used for explaining the prior art color television camera;

FIGS. 10A to 10G are waveform diagrams used for explaining the example of the invention shown in FIG. 8;

FIG. 11 is a block diagram showing another example of the solid state color television camera according to the invention; and FIGS. 12 and 13 are diagrams showing other examples of the color filters used in the invention.

DESCRIPTION OF THE PREFERRED EMBODIMENTS

Before describing the present invention, a prior art color television camera will be now described with reference to FIGS. 1 to 7 in which two solid state image sensing devices each using, for example, a CCD as an image sensing element are employed and a color resolving filter, which will be described later, is disposed in front of each of the solid state image sensing devices.

Figure 1:
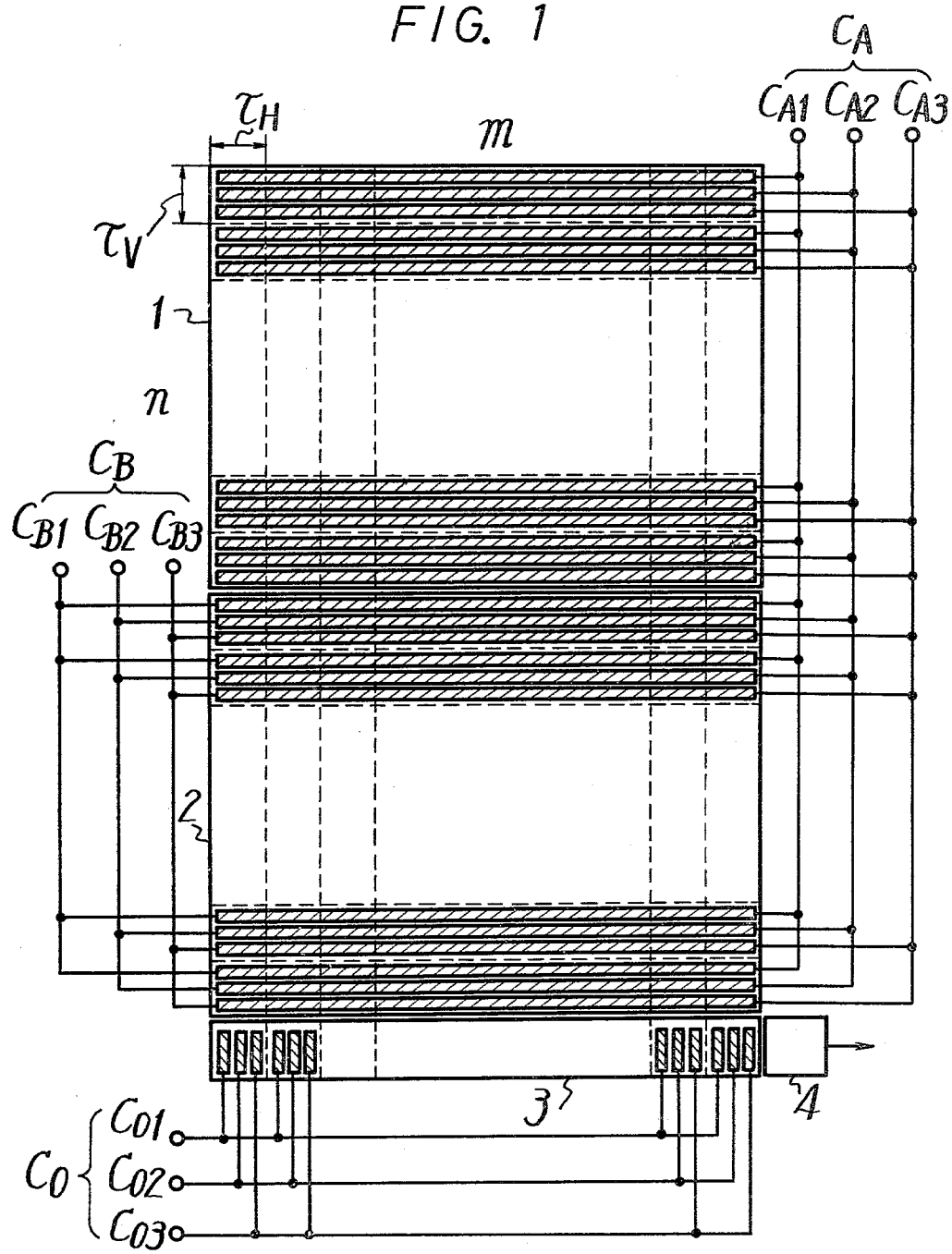
FIG. 1 is a plan view showing an example of the prior art color television camera in which two solid state image sensing devices such as CCDs are used.

The prior art solid state color television camera, as shown in FIG. 1, is formed of image sensing unit 1, which consists of m's number of image sensing elements or areas arranged in the horizontal direction of a picture screen at a pitch $\tau_H$, and n's number of image sending elements of areas arranged in the vertical direction of the screen at a pitch of $\tau_V$, a storage unit 2 of the similar construction and an output register 3 of m bits. During each vertical scanning period $T_S$, charges are given to the image sensing unit 1 by taking the photo of an object, and the charges are transferred at high speed at every line to the storage unit 2 by n's number of transfer pulses $C_A$ following a transfer start marker pulse $M_T$ in a vertical blanking period $T_B$ including a next vertical synchronizing signal $S_V$ as shown in FIGS. 2A and 2B. As shown in FIG. 2C, after the charges have been transferred completely, they are sequentially transferred by a transfer pulse $C_B$ (refer to FIG. 2D) at a time after a horizontal synchronizing signal $S_H$ within each horizontal period by one line to the output shift register 3 during a following vertical scanning period $T_S$. From the output register 3, the image informations are read out with a transfer pulse $C_O$ by every m-bit in series during each horizontal scanning period and then delivered through an output unit 4. FIGS. 2C and 2D show the vertical scanning period $T_S$ shown in FIG. 2A in an enlarged scale. The respective transfer pulses $C_A$, $C_B$ and $C_D$ are formed of three-phase clock pulses $C_{A1}$, $C_{A2}$, $C_{A3}$; $C_{B1}$, $C_{B2}$, $C_{B3}$; and $C_{O1}$, $C_{O2}$, $C_{O3}$, respectively, in this example, as shown in FIG. 1.

In front of the image sensing unit 1 of one of two solid state image sensing devices, there is disposed a color filter 5 in which green color (G) filter elements ($F_G$), each passing therethrough only a green color light, oppose or face all the picture elements, as shown in FIG. 3, and in front of the image sensing unit 1 of the other image sensing device there is disposed a color filter 6 in which red color filter elements $F_R$, each passing therethrough only a red color light, oppose or face the picture elements arranged at every other horizontal line and blue color filter elements $F_B$, each passing therethrough only a blue color light, oppose or face the picture elements arranged in remaining every other horizontal line, respectively, as shown in FIG. 4. Accordingly, from one of the solid state image sensing devices there is developed an output $S_1$ which is a green primary color signal G in all the horizontal period (refer to FIG. 5A) and from the other solid state image sensing device, there is developed an output $S_2$ which includes red and blue primary color signals R and B alternately at every other horizontal period as shown in FIG. 5B.

Figure 6:
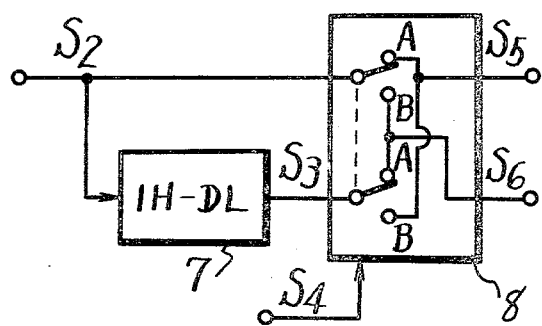
FIG. 6 is a part of the circuit used in connection with the CCDs shown in FIG. 1.

As described previously, when the luminance signal and carrier color signal are provided from the picked-up signals, the red, green and blue primary color signals must be produced at each horizontal period. To this end, in the above solid state color television camera, as shown in FIG. 6, there are provided a delay circuit 7 which will delay the input signal $S_2$ by one horizontal period as a signal $S_3$ (refer to FIG. 5C) and a switching circuit 8. That is, the signal $S_2$ from the solid state image sensing device is fed to one of the input terminals of the switching circuit 8 and through the delay circuit 7 to the other input terminal of the switching circuit 8 as the delayed signal $S_3$. The switching circuit 8 is switched by a signal $S_4$ (refer to FIG. 5D), which is synchronized with the horizontal synchronizing signal $S_H$, at every one horizontal period to be in contact with its fixed contacts A and B alternately with the result that at its output terminals there are obtained the signals applied to the input terminals alternately at every one horizontal period. That is, from one of the output terminals of the switching circuit 8 there is always derived, for example, an output signal $S_5$ in which the red primary color signals R and R' are continued as shown in FIG. 5E, and from the other output terminal of the switching circuit 8 there is always derived an output $S_6$ in which the blue primary color signals B and B' are continued as shown in FIG. 5F. Thus, during each horizontal period the red, green and blue primary color signals are simultaneously produced, respectively.

When the luminance signal is produced from the signal which is provided by making the sequential red and blue primary color signals simultaneously pass through the delay circuit and switching circuit, a false signal is generated in a low frequency band of the luminance signal. That is, this false signal in the low band of the luminance signal is generated at such a region where the red or blue color signal changes in the vertical direction. This false signal will be now described.

FIG. 7A shows the case where an object is changed in the vertical direction. In this case, in order to simplify the explanation, it is assumed that the red color signal R and the blue color signal B are changed reversely or in the complementary direction. Accordingly, the luminance signal Y must be constant without change as shown in FIG. 7C. In this case, for the sake of brevity, such object is picked up that an output from the CCD chip corresponding to the green color light is zero or the object of magenta color is picked up.

However, as in the above prior art color television camera, the signal, which is provided in such a manner that the sequential red and blue primary color signals are made simultaneously by the delay circuit 7 and the switching circuit 8, has remained the feature of the line sequential signal as it is, as shown in FIG. 7B, and the timing in change of both output signals and accordingly the phases of the carriers for both the signals are opposite with each other, because the timing of sampling for obtaining both the signals from the CCD chip is reverse in phase. In such a case where the red and blue color signals are changed at the same amount and the same phase, if both the signals are composed, their carrier components are cancelled with each other. However, when both the signals are changed at the opposite phases as set forth above, they are intensified. Thus, if such signals are composed, a false signal with ripple components is superimposed on the composed signal as shown in FIG. 7D.

As described above, with the prior art color television camera, a distortion is caused in the luminance signal due to the line-sequence property of the red and blue primary color signals.

Therefore, as described previously, the present invention is to provide a solid state color television camera which is free from the above defect inherent to the prior art. In the present invention, instead of using all of three kinds of color filter elements $F_R$, $F_G$ and $F_B$, each passing therethrough one of the different primary color lights, respectively, such a filter element is used which will pass therethrough two different primary color lights, as one of the filter elements.

The present invention will be hereinafter described on such an example of the solid state color television camera in which two image sensing devices are used as an image pick-up element and instead of the color filter element $F_B$, which passes therethrough the blue color light, a color filter element, which will pass therethrough the red and blue primary color lights, and accordingly a magenta filter element $F_{Mg}$ is used with reference to FIGS. 8 to 10.

Figure 8:
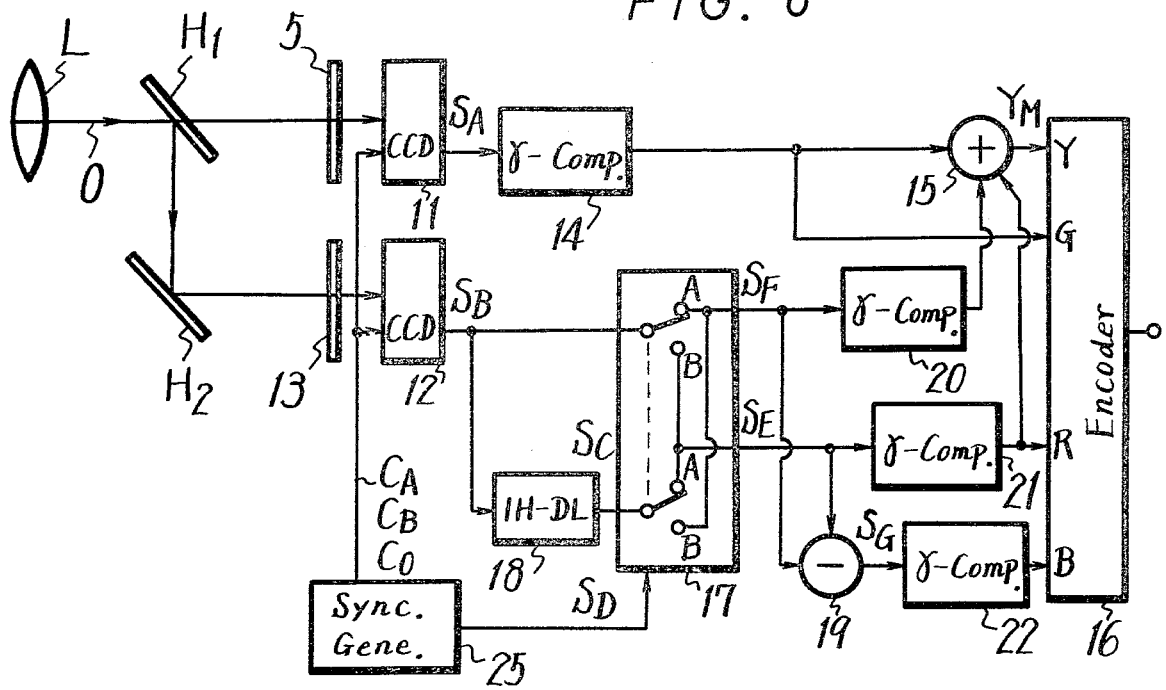
FIG. 8 is a block diagram showing an example of the color television camera according to the invention.
Figure 9:
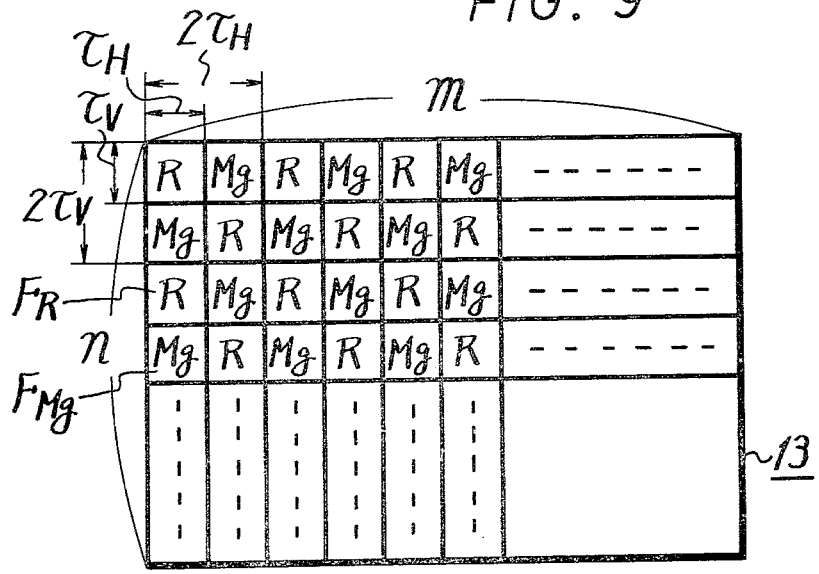
FIG. 9 is a plan view showing an example of the color filter used in the solid state color television camera according to the present invention.

FIG. 8 shows an example of the solid state color television camera according to the present invention. In a preferred embodiment of the invention as shown in FIG. 8, there are provided solid state image sensing devices such as CCD chips 11 and 12. In front of the image sensing device 11, there is located a color filter 5 which consists of a number of green color filter elements $F_G$ (FIG. 5) facing all the picture elements of the image sensing device 11 as in the prior art, while in front of the other image sensing device 12, there is located a color filter 13, which consists of red color filter elements $F_R$ facing every other picture element of the device 12 arranged in the longitudinal (vertical) and lateral (horizontal) directions and magenta color filter elements $F_{Mg}$ facing remaining every other picture element, namely filter elements $F_R$ and $F_{Mg}$ arranged in a checkered pattern as shown in FIG. 9. An incident light O from an object (not shown) passes through a lens system L, is then divided by half mirrors $H_1$ and $H_2$, and is projected on the CCD chips 11 and 12 through the color filters 5 and 13, respectively.

Accordingly, an output $S_A$ from the CCD chip 11 contains the green primary color signal G through all the horizontal periods as shown in FIG. 10A, and an output $S_B$ from the CCD chip 12 contains the red primary color signal R and magenta color signal Mg alternately at every picture element, as shown in FIG. 10B. In this case, the repeating order of the red primary color signal R and the magenta color signal Mg is inversed between the adjacent horizontal periods as may be apparent from FIG. 9.

In the case of the solid state image sensing device using a CCD chip, since the sensitivity to the blue color is lower than that to the red color, the red and blue color signal components are not equal in amount. However, the transmissibility of the filter element $F_{Mg}$ is selected such that a factor $\beta$ defined by $Mg = R + \beta B$ becomes, for example, 0.4 ($\beta = 0.4$). The output $S_A$ from the CCD chip 11 or the green primary color signal G is fed to a $\gamma$-compensation or correction circuit 14 to be $\gamma$-corrected, and thereafter to an adder 15, which will produce a luminance signal, and also to an NTSC encoder 16 for providing a carrier color signal.

The output $S_B$ from the CCP chip 12 is fed, as it is, to one of the input terminals of a switching circuit 17 and to the other input terminal thereof through a delay circuit 18 which delays the output $S_B$ by one horizontal period as a signal $S_C$ shown in FIG. 10C. The switching circuit 17 is switched with a switching signal $S_D$ (refer to FIG. 10D), which is in synchronism with the transfer pulse $C_O$ for reading out the output from the CCD chip 12 and in correspondence with a repeating frequency $1/2\tau_H$ of the red and magenta color signals in the horizontal direction, to be in contact with contacts A and B alternately at every picture element. The switching signal $S_D$ is produced by a synchronous signal generator 25 provided in the television camera, which generator 25 also produces clock signals $C_O$, $C_A$ and $C_B$ applied to the CCD chips 11 and 12, respectively. Thus, the switching circuit 17 produces at its one output terminal a signal $S_E$, which includes the red primary color signals R in one horizontal period and the red primary color signals R' in a horizontal period before the former by one horizontal period alternately, as shown in FIG. 10E, and at its other output terminal a signal $S_F$, which includes the magenta color signals Mg in one horizontal period and the magenta color signals Mg' in a horizontal period before the former by one horizontal period alternately, as shown in FIG. 10F.

The signals $S_E$ and $S_F$ thus obtained or red primary color signals and magenta color signals are applied to an adder 19 which achieves the operation $S_F - S_E$, i.e., $Mg - R = (R + \beta B) - R = \beta B$, and produces a signal $S_G$ consisting of the blue primary color signal component B as shown in FIG. 10G. The signals $S_E$, $S_F$ and $S_G$ are also applied to $\gamma$-correction circuits 21, 20 and 22, respectively. The $\gamma$-correction circuit 21 develops a red primary color signal $R\gamma$ which is $\gamma$-corrected, the $\gamma$-correction circuit 20 develops a magenta color signal $Mg\gamma$ which is $\gamma$-corrected, and the $\gamma$-correction circuit 22 develops a blue primary color signal $B\gamma$ which is $\gamma$-corrected, respectively.

The $\gamma$-corrected magenta color signal $Mg\gamma$ and red primary color signals $R\gamma$ are fed to the adder 15 to be added to the green primary color signal $G\gamma$ from the $\gamma$-correction circuit 15 and hence the adder 15 produces a luminance signal, while the $\gamma$-corrected red primary color signal $R\gamma$ and blue primary color signal $B\gamma$ are fed to the NTSC encoder 16 which processes the same together with the green primary color signal $G\gamma$ and produces a carrier chrominance signal, as will be described later.

In the adder 15, the $\gamma$-corrected red, magenta and green color signals $R\gamma$, $Mg\gamma$ and $G\gamma$ are composed at the ratio of 0.15:0.15:0.6 to produce a composite signal $Y_M$, which is expressed as follows:

$$Y_M = 0.6\,G\gamma + 0.15\,R\gamma + 0.15\,Mg\gamma$$
$$= 0.6\,G\gamma + 0.15\,R\gamma + 0.15\,(R + 0.4B)\gamma$$

The composite signal $Y_M$ is fed to the NTSC encoder 16 to be composed with the carrier chrominance signal. Thus, a television signal of the NTSC system is produced by the NTSC encoder 16.

In the above example, the luminance and carrier chrominance signals are produced from the $\gamma$-corrected signals, but after luminance and carrier chrominance signals are produced, they are $\gamma$-corrected.

FIG. 11 is a block diagram showing another example of the invention to achieve the process described just above in which the reference numerals and symbols the same as those of FIG. 8 designate the same components. In this example, the signal $S_A$ from the CCD chip 11, which is not $\gamma$-corrected, and the signals $S_E$ and $S_F$ from the switching circuit 17, which are not $\gamma$-corrected, are fed to the adder 15 to produce a luminance signal Y, and the signals $S_A$, $A_E$ and $S_G$, as they are, are also applied to the NTSC encoder 16 to produce the carrier chrominance signal C. This carrier chrominance signal C and luminance signal Y are composed in the NTSC encoder 16 to produce a composite signal (Y+C). This composite signal is fed to a $\gamma$-correction circuit 23 to be $\gamma$-corrected. The $\gamma$-corrected composite signal is delivered as an output signal through a low pass filter 24. That is, the output from the encoder 16 is $\gamma$-corrected as an output signal $(Y+C)\gamma$, which is expressed as follows:

$$(Y + C)\gamma = Y\gamma\left(1 + \frac{C}{Y}\right)\gamma \qquad (a)$$
$$= Y\gamma\left(1 + \frac{C}{Y}\right)$$
$$= Y\gamma + \gamma\frac{Y\gamma}{Y}C$$

The first factor $Y\gamma$ in the equation (a) is the $\gamma$-corrected luminance signal itself, and the second factor is a $\gamma$-corrected carrier chrominance signal.

As described above, since the above case the magenta color filter element $F_{Mg}$, which passes therethrough the blue and red color lights, are used instead of the blue filter element $F_B$ which presses therethrough only the blue color light, the red color light of the object is recieved by all the picture elements of the CCD chip 12. Further, when the luminance signal is produced in this case, the red primary color signal component in the magenta color signal is utilized effectively. Therefore, the carrier of the spatial sampling of the red primary color signal component in the luminance signal becomes the same as the carrier of the spatial sampling of the green primary color signal G from the CCD chip 11. Accordingly, with regard to the distortion of the luminance signal caused by the red and blue primary color signals R and B have the line-sequence property, the problem on the red color signal component disappears. With regard to the distortion by the blue color signal components, since the ratio of the blue color signal to the whole luminance signal is small, such 10%, the distortion by the blue color signal proposes almost no problem, and accordingly, the distortion of the luminance signal by the false signal is greatly improved by this invention.

Further, since in this invention the color filter element which will pass therethrough two kinds of the primary color lights, for example, magenta color filter element $F_{Mg}$ is used, the red color signal can be always obtained and hence the light utilization factor is improved compared with the filter element $F_B$ which will pass therethrough only the blue color light.

Further, by selecting the red and blue light transmissibilities of the magenta color filter element $F_{Mg}$, the transmissibility thereof can be made high, so that the defect of the solid state image sensing device using a CCD or the sensitivity to the blue color can be improved.

It is required in the prior art color filter consisting of the red and blue color filter elements $F_R$ and $F_B$ shown in FIG. 4, to dye the parts of the filter corresponding to the red and blue color filter elements, respectively. With the present invention, on the contrary, since the color filter consists of the filter element $F_R$ for a first primary color, for example, red color and the filter element $F_{Mg}$ for the first and second primary colors, for example, magenta color, the manufacture of the color filter is very easy since it is enough that parts of a magenta color filter corresponding to the red color filter elements are only dyed.

The above example of the invention is for the case where no interlace is taken into account. For the case where the interlace is considered, in front of the image sensing portion of the CCD chip 12 there is disposed a color filter which consists, as shown in FIG. 12, of two of the same filter members, each being composed of filter elements $F_R$ and $F_{Mg}$ arranged alternately in the horizontal direction, which two filter members are arranged alternately in the vertical direction as a set.

The above example of the invention uses two solid state image sensing device or CCD chips as the image sensing pick-up element, but the present invention can be applied to the case where only one image sensing element is used. In this case, a color filter such as shown in FIG. 13 is disposed in front of the image sensing portion of the single solid state image sensing device. That is, with this color filter, a green color filter element $F_G$ faces the picture element at every other one in the horizontal direction, and red and magenta color filter elements $F_R$ and $F_{Mg}$ face the picture element at the remaining every other one alternately. In this case, the respective filter elements $F_R$ and $F_{Mg}$ are arranged as a checkered pattern as a whole. The color filter shown in FIG. 13 can also be applied for the interlace.

In the above description, the CCD chip is used as the solid state image sensing device, but it is, of course, possible that, as the solid state image sensing device, a BBD (bucket brigade device), can be used, and furthermore, any of a so-called well-known CTD (charge transfer device), can be utilized.

It will be apparent that many modifications and variations could be effected by one skilled in the art without departing from the spirit or scope of the novel concepts of the present invention, so that the spirit or scope of the invention should be determined by the appended claims only.

I claim as my invention:

1. A solid state television camera having a solid state image sensing device including a plurality of individual light sensing units arranged in both horizontal and vertical rows comprising:
   (a) a plurality of color filter elements with different transmissibilities faced with said individual light sensing units including first and second color filter elements for transmitting first and second primary color signals and third color filter elements for transmitting both of a third and said first primary color signals as a composite color signal;
   (b) a switching circuit for converting line sequential signals produced from each of said light sensing units into a simultaneous color signal;
   (c) an adder for adding said first and second primary color components and said composite color signal produced from each of said light sensing units faced with said first, second and third color filter elements individually by which a luminance signal is composed;
   (d) a mixer for mixing said composite color signal and said first primary color signal from which said third primary color signal is produced; and
   (e) a color encoder for encoding said first, second and third primary color signal components from which a composite color television signal is produced.

2. A solid state television camera according to claim 1, wherein said first, second and third primary color signals are red, green and blue color signals individually and said composite color signal is a magenta color signal composed of a predetermined ratio of said red and blue color signals.

3. A solid state television camera according to claim 2, wherein said third color filter element has a light transmissibility with a ratio nearly at $$Mg = R + 0.4B$$

in which
Mg is the magenta color signal component level,
R is the red color signal component level, and
B is the blue color signal component level.

4. A solid state television camera according to claim 2, wherein said solid state image sensing device includes two charge transfer device (CCD) chips, each having a plurality of individual light sensing units arranged in both horizontal and vertical rows.

5. A solid state television camera according to claim 4, wherein said charge transfer device (CTD) chips are charged coupled device (CCD) chips.

6. A solid state television camera according to claim 5, wherein said second color filter for transmitting said green color signal is faced with one of said CCD chips and said first and third color filters for transmitting said red and magenta color signals are faced with another CCD chip individually.

7. A solid state television camera according to claim 6, wherein said first and second color filters are positioned to form a checkered pattern on said plurality of individual light sensing units of another CCD chip.

8. A solid state television camera according to claim 2, wherein said solid state image sensing device includes one charge coupled device (CCD) and said first, second and third color filters for transmitting red, green and magenta color signals individually are faced with said plurality of individual light sensing units of said one CCD chip.

* * * * *